Sept. 18, 1928.  
W. M. GOODWIN  
1,684,955  
POPPET VALVE ACTUATING DEVICE  
Filed May 3, 1927
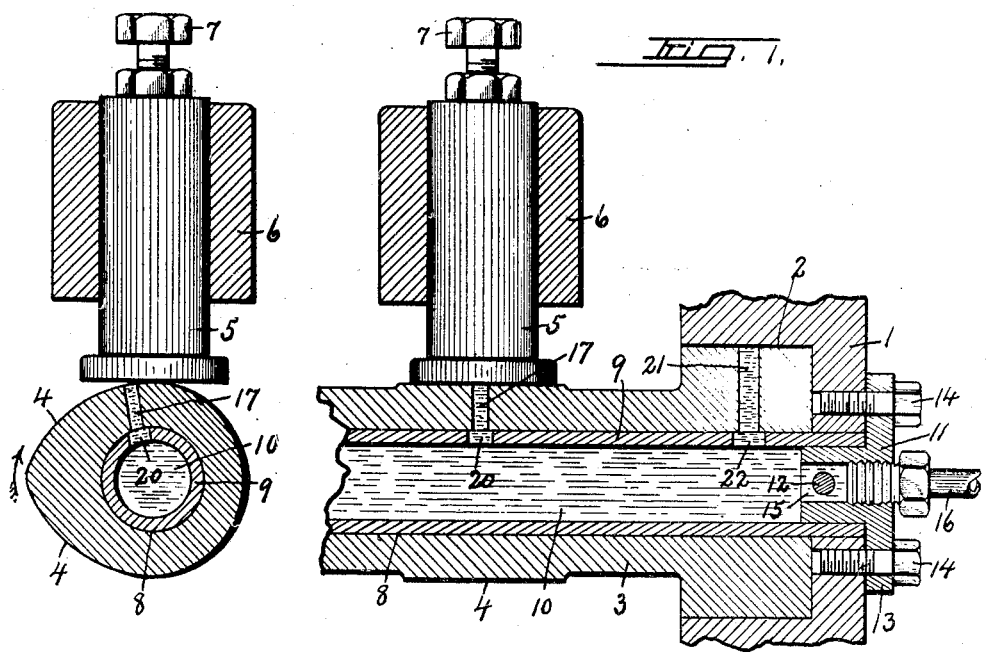
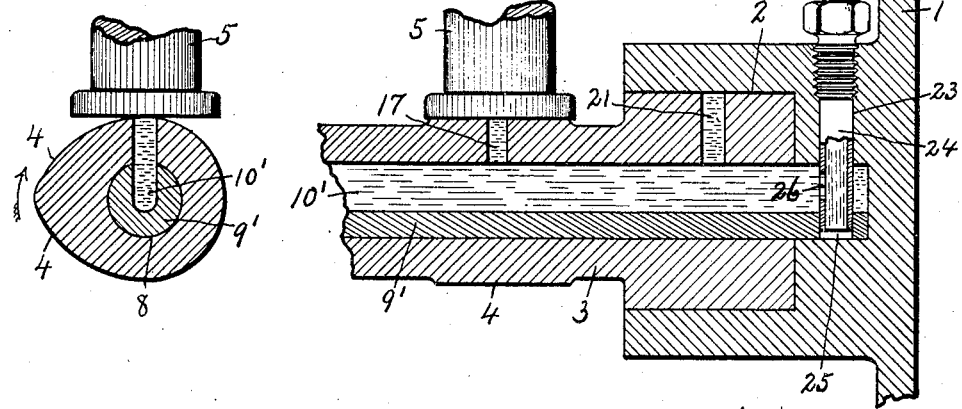

Patented Sept. 18, 1928.

1,684,955

UNITED STATES PATENT OFFICE.

WILLIAM M. GOODWIN, OF CENTRAL SQUARE, NEW YORK.

POPPET-VALVE ACTUATING DEVICE.

Application filed May 3, 1927. Serial No. 188,471.

This invention relates to a self-oiling cam and tappet contact for distributing a film of oil between the contacting faces of a cam and valve operating tappet similar to that shown in my pending application Serial No. 160,406, filed January 11, 1927, as applied to internal combustion engines but obviously may be used in connection with cam-operated members for other purposes.

The main object is to provide means for automatically and forcibly applying oil to the contacting surfaces between the cam and tappet operated thereby at each revolution of the cam or cam shaft for the purpose of not only reducing wear but also to reduce the noise incidental to the action of the cam against the tappet.

Another object is to provide each cam with a restricted passage extending from the interior to the exterior thereof and to automatically regulate the flow of oil through said passage in such manner that it will be distributed across the contact face of the tappet only when the outer end of the passage is registered with that surface.

In other words, I have sought to provide means whereby the flow of the oil through the passage will be cut off at all times except when the outer end thereof is traveling across the contact surface of the tappet.

Another object is to provide means whereby the bearing or bearings for the cam shaft will be lubricated intermittently or once at each revolution of the shaft.

Other objects and uses relating to specific parts of the invention will be brought out in the following description.

In the drawings:—

Figure 1 is a longitudinal vertical sectional view of a portion of a cam shaft and the guide for one of the tappets showing the various features of the invention and also showing one of the bearings for the cam shaft together with a portion of the means for supplying oil to the stationary conduit within the main shaft.

Figure 2 is a transverse sectional view through one of the cams showing the adjacent tappet in elevation.

Figure 3 is a longitudinal sectional view similar to Figure 1 showing a slightly modified form of the invention.

Figure 4 is a transverse sectional view through one of the cams shown in Figure 3 and the adjacent portion of the tappet co-operating therewith.

In Figure 1 is shown a portion of a frame —1— having a journal bearing —2— in which is journaled one end of the main shaft —3— having a cam —4— at one end of the inner bearing —2— for engagement with the inner end face of a radially movable tappet —5—.

This tappet —5— is reciprocally movable in a suitable guide —6— on the frame —1— as a part of the means for transmitting motion to the poppet valve of an internal combustion engine and for this purpose is provided in its outer end with an adjustable member —7— for taking up lost motion in the connections between tappet and valve.

The cam shaft —3— is preferably hollow or provided with a central lengthwise opening —8— co-axial therewith for receiving a non-rotatable and in this instance a stationary tubular oil conduit —9— having a lengthwise oil chamber —10— extending beyond opposite ends of the cam —4— and also beyond opposite ends of the journal bearing —2— for receiving and retaining a quantity of oil indicated by dotted lines.

A bushing —11— is secured by a pin —12— in the outer end of the tubular conduit —9— and is provided at its outer end with an annular flange —13— secured to the adjacent end of the frame —1— by means of bolts —14—.

This bushing —11— is provided with a central lengthwise passage —15— to which is connected one end of an oil supply pipe —16— leading to any available source of supply by which oil may be fed to the interior of the tubular conduit —9— under pressure.

The cam shaft —3— is provided with a relatively small outlet passage —17— extending from its inner face through the outer face of the cam —4— in approximate alinement with the transverse center of the inner end face of the tappet —5—.

The tubular conduit —9— is provided with an outlet —20— which is relatively narrow circumferentially and disposed in the circular plane of travel of the passage —17— in the cam shaft —3— so that the passage —17— may register with the outlet —20— intermittingly or once during each revolution of the cam shaft to allow the oil to pass from the chamber —10— through the registering openings —20— and —17— and against the inner end face of the tappet —5— thereby producing a thin film of oil between the contacting surfaces of the cam and tappet for reducing the wear of the contacting surfaces and also for reducing the noise incidental to said contact.

Similar means may be provided for intermittingly lubricating the bearing for the outer end of the cam shaft —3—, said means consisting, in this instance, of an opening —21— extending from the interior to the exterior of the journal and relatively narrow circumferentially and adapted to register with an outlet opening —22— which is also relatively narrow circumferentially and is formed in the adjacent portion of the tubular conduit —9— whereby the registration of the opening —21— with the opening —22— at each revolution of the cam shaft will permit a limited quantity of the oil to pass from the chamber —10— to the bearing —2—.

In Figures 3 and 4 is shown a stationary conduit —9'— having a lengthwise chamber —10'— open at the top but relatively narrow circumferentially and with which the openings —17— and —21— in the cam shaft are adapted to intermittingly register at each revolution of said cam shaft for the same purposes as previously described in connection with the construction shown in figures 1 and 2.

As shown in Figure 3 the frame —1— at one end of the bearing —2— is provided with a radial opening —23— for receiving a pipe section —24— which extends through a transverse opening —25— in the adjacent end of the conduit —9'— for holding said conduit against angular or axial movement, said pipe section —24— being provided with an outlet —26— registering with the adjacent portion of the oil chamber —10— to permit the oil to pass from the pipe section —24— into said chamber.

An oil supply pipe —16'— leading from any available source of supply under pressure is connected to the pipe section —24— for maintaining a proper supply of oil in the chamber —10—.

The openings —17— in the cam shaft extend to the surfaces of the cams near the junction of the lower side with the high side of the cams facing the direction of rotation, said openings being slightly inclined from radial lines in the direction of said rotation so as to assist in distributing the film of oil diametrically across the adjacent tappet face —5—.

For a similar reason the opening —20— in the conduit —9— faces the contact end of the tappet —5— but is arranged just back of a direction line between the axis of the cam shaft and axis of the tappet so as to begin the distribution of oil to the conact faces of the tappet and cam at about the time the opening —17— begins to register with the inner end face of the tappet, the incline of the opening —17— in the direction of rotation serving to continue the application of the film of oil to the contacting surfaces of the cam and tappet across practically the entire diameter of the contacting surface of the tappet.

It will be noted that in the construction shown the feed of oil to the contacting surfaces of the cam and tappet is cut off at all times except when the outlet opening —17— is registered with the opening —20—, Figures 1 and 2, or with the open side of the chamber —10'—, Figures 3 and 4, thereby economizing in the use of oil and at the same time distributing a thin film of such oil between the contact surfaces at the time the contacting surface of the cam is traveling from the lower point to the high point thereof against the tappet.

The constructions shown and described are particularly simple and efficient but it is evident that various changes may be made in the details without departing from the spirit of this invention.

What I claim is:

1. In a poppet-valve actuating device, a non-rotatable oil containing member having a peripheral oil outlet passage relatively narrow circumferentially, a cam-shaft rotatable around and upon said member and provided with a cam surface, and a valve operating tappet in contact with the cam surface, said cam shaft having an oil outlet relatively narrow circumferentially and extending to the surface of the cam for registration with the first-named outlet once during each revolution of the shaft when the oil outlet in the cam shaft is registered with the tappet.

2. In a poppet-valve actuating device, a hollow rotary cam-shaft having a cam surface and an oil passage extending from said surface to the interior surface of the shaft, said passage being relatively narrow circumferentially, a tappet contacting with the portion of the cam-surface in which the passage is formed, a non-rotatable member engaging the inner surface of the shaft adjacent said passage, and means for feeding oil under pressure into said member and thence to the passage for applying a film of oil to the contacting portions of the cam and tappet only when the passage is registered with the tappet.

In witness whereof I have hereunto set my hand this 26th day of April, 1927.

WILLIAM M. GOODWIN.